(12) United States Patent
Gordon et al.

(10) Patent No.: US 7,358,972 B2
(45) Date of Patent: *Apr. 15, 2008

(54) SYSTEM AND METHOD FOR CAPTURING FACIAL AND BODY MOTION

(75) Inventors: Demian Gordon, Venice, CA (US); Jerome Chen, Redondo Beach, CA (US); Albert Robert Hastings, Big Bear, CA (US); Jody Echegaray, Los Angeles, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/557,081

(22) Filed: Nov. 6, 2006

(65) Prior Publication Data

US 2007/0058839 A1    Mar. 15, 2007

Related U.S. Application Data

(63) Continuation of application No. 10/427,114, filed on May 1, 2003, now Pat. No. 7,218,320.

(51) Int. Cl.
*G06T 15/70* (2006.01)

(52) U.S. Cl. ............... 345/473; 345/474; 345/475; 345/660; 345/952; 345/957

(58) Field of Classification Search ............ 345/473, 345/474, 475, 660, 952, 957; 382/103, 107
See application file for complete search history.

(56) References Cited

U.S. PATENT DOCUMENTS

| | | | |
|---|---|---|---|
| 5,774,591 A | 6/1998 | Black et al. | |
| 5,802,220 A | 9/1998 | Black et al. | |
| 6,020,892 A | 2/2000 | Dillon | |
| 6,121,953 A | 9/2000 | Walker | |
| 6,215,498 B1 | 4/2001 | Filo et al. | |
| 6,272,231 B1 | 8/2001 | Maurer et al. | |
| 6,324,296 B1 * | 11/2001 | McSheery et al. | 382/107 |
| 6,707,444 B1 * | 3/2004 | Hendriks et al. | 345/156 |
| 6,774,869 B2 | 8/2004 | Biocca et al. | |
| 6,788,333 B1 | 9/2004 | Uyttendaele et al. | |
| 6,831,603 B2 | 12/2004 | Menache | |

(Continued)

Primary Examiner—Kimbinh T. Nguyen
(74) Attorney, Agent, or Firm—O'Melveny & Myers LLP

(57) ABSTRACT

A system and method for capturing motion comprises a motion capture volume adapted to contain at least one actor having body markers defining plural body points and facial markers defining plural facial points. A plurality of body motion cameras and a plurality of facial motion cameras are arranged around a periphery of the motion capture volume. The facial motion cameras each have a respective field of view narrower than a corresponding field of view of the body motion cameras. The facial motion cameras are arranged such that all laterally exposed surfaces of the actor while in motion within the motion capture volume are within the field of view of at least one of the plurality of facial motion cameras at substantially all times. A motion capture processor is coupled to the plurality of facial motion cameras and the plurality of body motion cameras to produce a digital model reflecting combined body and facial motion of the actor. At least one microphone may be oriented to pick up audio from the motion capture volume.

14 Claims, 7 Drawing Sheets

U.S. PATENT DOCUMENTS

| | | |
|---|---|---|
| 6,950,104 B1 | 9/2005 | Marschner et al. |
| 7,012,637 B1 | 3/2006 | Blume et al. |
| 7,068,277 B2 | 6/2006 | Menache |
| 7,106,358 B2 * | 9/2006 | Valliath et al. .......... 348/14.08 |

* cited by examiner

SYSTEM AND METHOD FOR CAPTURING FACIAL AND BODY MOTION

RELATED APPLICATION DATA

This patent application is a continuation of U.S. patent application Ser. No. 10/427,114, filed May 1, 2003 now U.S. Pat. No. 7,218,320.

CROSS-REFERENCE TO RELATED APPLICATION

This application claims priority pursuant to 35 U.S.C. § 119(e) to U.S. provisional patent application Ser. No. 60/454,872, filed Mar. 13, 2003, entitled "Motion Capture System."

BACKGROUND OF THE INVENTION

1. Field of the Invention

The present invention relates to three-dimensional graphics and animation, and more particularly, to a motion capture system that enables both facial and body motion to be captured simultaneously within a volume that can accommodate plural actors.

2. Description of Related Art

Motion capture systems are used to capture the movement of a real object and map it onto a computer generated object. Such systems are often used in the production of motion pictures and video games for creating a digital representation of a person that is used as source data to create a computer graphics (CG) animation. In a typical system, an actor wears a suit having markers attached at various locations (e.g., having small reflective markers attached to the body and limbs) and digital cameras record the movement of the actor from different angles while illuminating the markers. The system then analyzes the images to determine the locations (e.g., as spatial coordinates) and orientation of the markers on the actor's suit in each frame. By tracking the locations of the markers, the system creates a spatial representation of the markers over time and builds a digital representation of the actor in motion. The motion is then applied to a digital model, which may then be textured and rendered to produce a complete CG representation of the actor and/or performance. This technique has been used by special effects companies to produce incredibly realistic animations in many popular movies.

Motion capture systems are also used to track the motion of facial features of an actor to create a representation of the actor's facial motion and expression (e.g., laughing, crying, smiling, etc.). As with body motion capture, markers are attached to the actor's face and cameras record the actor's expressions. Since facial movement involves relatively small muscles in comparison to the larger muscles involved in body movement, the facial markers are typically much smaller than the corresponding body markers, and the cameras typically have higher resolution than cameras usually used for body motion capture. The cameras are typically aligned in a common plane with physical movement of the actor restricted to keep the cameras focused on the actor's face. The facial motion capture system may be incorporated into a helmet or other implement that is physically attached to the actor so as to uniformly illuminate the facial markers and minimize the degree of relative movement between the camera and face. For this reason, facial motion and body motion are usually captured in separate steps. The captured facial motion data is then combined with captured body motion data later as part of the subsequent animation process.

An advantage of motion capture systems over traditional animation techniques, such as keyframing, is the capability of real-time visualization. The production team can review the spatial representation of the actor's motion in real-time or near real-time, enabling the actor to alter the physical performance in order to capture optimal data. Moreover, motion capture systems detect subtle nuances of physical movement that cannot be easily reproduced using other animation techniques, thereby yielding data that more accurately reflects natural movement. As a result, animation created using source material that was collected using a motion capture system will exhibit a more lifelike appearance.

Notwithstanding these advantages of motion capture systems, the separate capture of facial and body motion often results in animation data that is not truly lifelike. Facial motion and body motion are inextricably linked, such that a facial expression is often enhanced by corresponding body motion. For example, an actor may utilize certain body motion (i.e., body language) to communicate emotions and emphasize corresponding facial expressions, such as using arm flapping when talking excitedly or shoulder shrugging when frowning. This linkage between facial motion and body motion is lost when the motions are captured separately, and it is difficult to synchronize these separately captured motions together. When the facial motion and body motion are combined, the resulting animation will often appear noticeably abnormal. Since it is an objective of motion capture to enable the creation of increasingly realistic animation, the decoupling of facial and body motion represents a significant deficiency of conventional motion capture systems.

Another drawback of conventional motion capture systems is that motion data of an actor may be occluded by interference with other objects, such as props or other actors. Specifically, if a portion of the body or facial markers is blocked from the field of view of the digital cameras, then data concerning that body or facial portion is not collected. This results in an occlusion or hole in the motion data. While the occlusion can be filled in later during post-production using conventional computer graphics techniques, the fill data lacks the quality of the actual motion data, resulting in a defect of the animation that may be discernable to the viewing audience. To avoid this problem, conventional motion capture systems limit the number of objects that can be captured at one time, e.g., to a single actor. This also tends to make the motion data appear less realistic, since the quality of an actor's performance often depends upon interaction with other actors and objects. Moreover, it is difficult to combine these separate performances together in a manner that appears natural.

Yet another drawback of conventional motion capture systems is that audio is not recorded simultaneously with the motion capture. In animation, it is common to record the audio track first, and then animate the character to match the audio track. During facial motion capture, the actor will lip synch to the recorded audio track. This inevitably results in a further reduction of the visual quality of the motion data, since it is difficult for an actor to perfectly synchronize facial motion to the audio track. Also, body motion often affects the way in which speech is delivered, and the separate capture of body and facial motion increases the difficulty of synchronizing the audio track to produce a cohesive end product.

Accordingly, it would be desirable to provide a motion capture system that overcomes these and other drawbacks of the prior art. More specifically, it would be desirable to provide a motion capture system that enables both body and facial motion to be captured simultaneously within a volume that can accommodate plural actors. It would also be desirable to provide a motion capture system that enables audio recording simultaneously with body and facial motion capture.

SUMMARY OF THE INVENTION

In accordance with the teachings of the present invention, a motion capture system and method is provided that enables both facial and body motion to be captured simultaneously within a volume that can accommodate plural actors. The motion capture system and method also enables audio recording simultaneously with body and facial motion capture.

More particularly, a system and method for capturing motion comprises a motion capture volume adapted to contain at least one actor having body markers defining plural body points and facial markers defining plural facial points. The motion capture volume may have any desired geometric shape, such as oval, round, rectangular, polygonal, etc. A plurality of body motion cameras and a plurality of facial motion cameras are arranged around a periphery of the motion capture volume. The facial motion cameras each have a respective field of view narrower than a corresponding field of view of the body motion cameras. The facial motion cameras are arranged such that all laterally exposed surfaces of the actor while in motion within the motion capture volume are within the field of view of at least one of the plurality of facial motion cameras at substantially all times. A motion capture processor is coupled to the plurality of facial motion cameras and the plurality of body motion cameras to produce a digital model reflecting combined body and facial motion of the actor. At least one microphone may be oriented to pick up audio from the motion capture volume.

In an embodiment of the invention, the motion capture volume further comprises a rectangular area subdivided into a plurality of quadrants. The quadrants each further comprise plural edges coincident with the periphery of the motion capture volume. The plurality of facial motion cameras further include first subgroups of cameras oriented toward respective ones of the edges. The plurality of facial motion cameras may further include second subgroups of cameras oriented toward respective ones of the edges and spatially separated from the first subgroups of cameras. The first subgroups of cameras are oriented with respect to the second subgroups of cameras so that their respective fields of view substantially overlap. The first and second subgroups of cameras may each further comprise at least three cameras. The plurality of facial motion cameras may further comprise third subgroups of cameras disposed respectively at corners of the motion capture volume and oriented generally toward a center of the motion capture volume.

In another embodiment of the invention, at least a first portion of the plurality of facial motion cameras are disposed at a first height above ground, and at least a second portion of the plurality of facial motion cameras are disposed at a second height above ground that is greater than the first height. The first portion of the plurality of facial motion cameras may be oriented slightly upward to not encompass within their respective fields of view other ones of the first portion of the plurality of facial motion cameras disposed substantially across the motion capture volume.

In yet another embodiment of the invention, the plurality of facial motion cameras and the plurality of body motion cameras each further comprise a polarized light source oriented to illuminate the motion capture volume and a polarized filter to block polarized light from like light sources of other cameras disposed across the motion capture volume.

A more complete understanding of the system and method for capturing body and facial motion will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

As will be further described below, the present invention satisfies the need for a motion capture system that enables both body and facial motion to be captured simultaneously within a volume that can accommodate plural actors. Further, the present invention also satisfies the need for a motion capture system that enables audio recording simultaneously with body and facial motion capture. In the detailed description that follows, like element numerals are used to describe like elements illustrated in one or more of the drawings.

Figure 1:
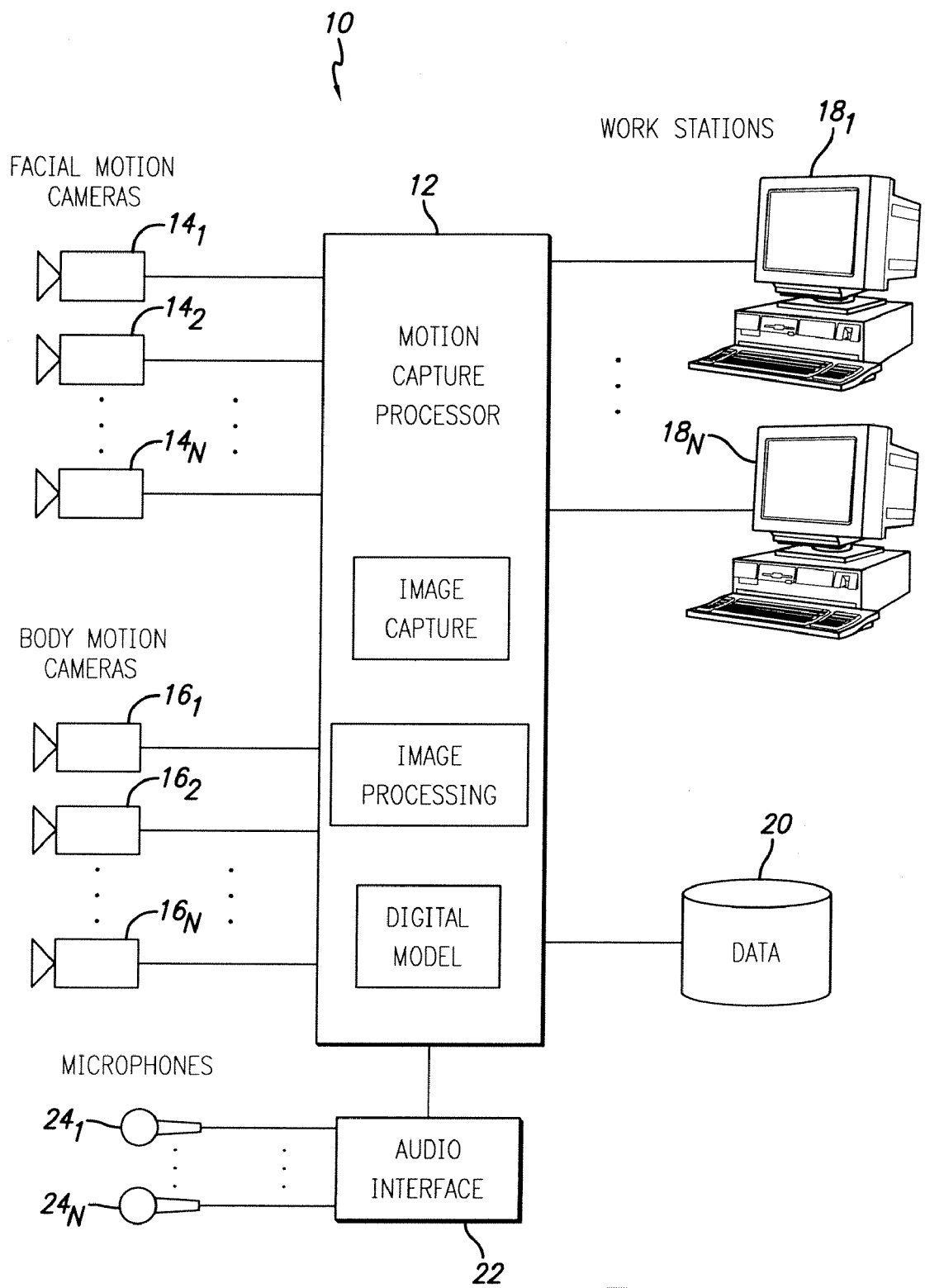
FIG. 1 is a block diagram illustrating a motion capture system in accordance with an embodiment of the present invention.

Referring first to FIG. 1, a block diagram illustrates a motion capture system 10 in accordance with an embodiment of the present invention. The motion capture system 10 includes a motion capture processor 12 adapted to communicate with a plurality of facial motion cameras $14_1$-$14_N$ and a plurality of body motion cameras $16_1$-$16_N$. The motion capture processor 12 may further comprise a programmable computer having a data storage device 20 adapted to enable the storage of associated data files. One or more computer workstations $18_1$-$18_N$ may be coupled to the motion capture processor 12 using a network to enable multiple graphic artists to work with the stored data files in the process of creating a computer graphics animation. The facial motion cameras $14_1$-$14_N$ and body motion cameras $16_1$-$16_N$ are arranged with respect to a motion capture volume (described below) to capture the combined motion of one or more actors performing within the motion capture volume.

Each actor's face and body is marked with markers that are detected by the facial motion cameras $14_1$-$14_N$ and body motion cameras $16_1$-$16_N$ during the actor's performance within the motion capture volume. The markers may be reflective or illuminated elements. Specifically, each actor's body may be marked with a plurality of reflective markers disposed at various body locations including head, legs, arms, and torso. The actor may be wearing a body suit formed of non-reflective material to which the markers are attached. The actor's face will also be marked with a plurality of markers. The facial markers are generally smaller than the body markers and a larger number of facial markers are used than body markers. To capture facial motion with sufficient resolution, it is anticipated that a high number of facial markers be utilized (e.g., more than 100). In one exemplary implementation, 152 small facial markers and 64 larger body markers are affixed to the actor. The body markers may have a width or diameter in the range of 5 to 9 millimeters, while the face markers may have a width or diameter in the range of 2 to 4 millimeters.

To ensure consistency of the placement of the face markers, a mask may be formed of each actor's face with holes drilled at appropriate locations corresponding to the desired marker locations. The mask may be placed over the actor's face, and the hole locations marked directly on the face using a suitable pen. The facial markers can then be applied to the actor's face at the marked locations. The facial markers may be affixed to the actor's face using suitable materials known in the theatrical field, such as make-up glue. This way, a motion capture production that extends over a lengthy period of time (e.g., months) can obtain reasonably consistent motion data for an actor even though the markers are applied and removed each day.

The motion capture processor 12 processes two-dimensional images received from the facial motion cameras $14_1$-$14_N$ and body motion cameras $16_1$-$16_N$ to produce a three-dimensional digital representation of the captured motion. Particularly, the motion capture processor 12 receives the two-dimensional data from each camera and saves the data in the form of multiple data files into data storage device 20 as part of an image capture process. The two-dimensional data files are then resolved into a single set of three-dimensional coordinates that are linked together in the form of trajectory files representing movement of individual markers as part of an image processing process. The image processing process uses images from one or more cameras to determine the location of each marker. For example, a marker may only be visible to a subset of the cameras due to occlusion by facial features or body parts of actors within the motion capture volume. In that case, the image processing uses the images from other cameras that have an unobstructed view of that marker to determine the marker's location in space.

By using images from multiple cameras to determine the location of a marker, the image processing process evaluates the image information from multiple angles and uses a triangulation process to determine the spatial location. Kinetic calculations are then performed on the trajectory files to generate the digital representation reflecting body and facial motion corresponding to the actors' performance. Using the spatial information over time, the calculations determine the progress of each marker as it moves through space. A suitable data management process may be used to control the storage and retrieval of the large number files associated with the entire process to/from the data storage device 20. The motion capture processor 12 and workstations $18_1$-$18_N$ may utilize commercial software packages to perform these and other data processing functions, such as available from Vicon Motion Systems or Motion Analysis Corp.

The motion capture system 10 further includes the capability to record audio in addition to motion. A plurality of microphones $24_1$-$24_N$ may be arranged around the motion capture volume to pick up audio (e.g., spoken dialog) during the actors' performance. The motion capture processor 12 may be coupled to the microphones $24_1$-$24_N$, either directly or though an audio interface 22. The microphones $24_1$-$24_N$ may be fixed in place, or may be moveable on booms to follow the motion, or may be carried by the actors and communicate wirelessly with the motion capture processor 12 or audio interface 22. The motion capture processor 12 would receive and store the recorded audio in the form of digital files on the data storage device 20 with a time track or other data that enables synchronization with the motion data.

Figure 2:
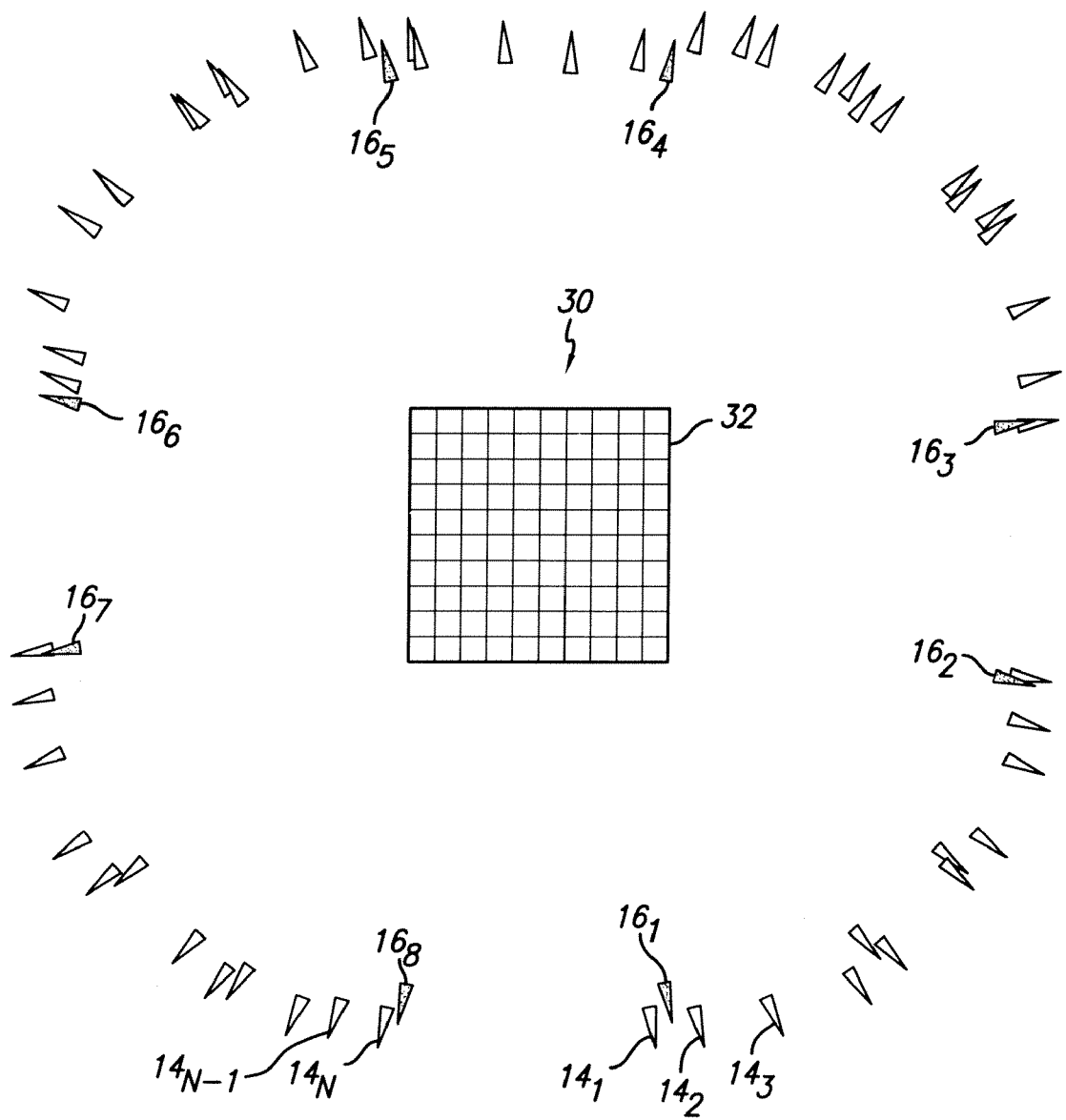
FIG. 2 is a top view of a motion capture volume with a plurality of motion capture cameras arranged around the periphery of the motion capture volume.
Figure 3:
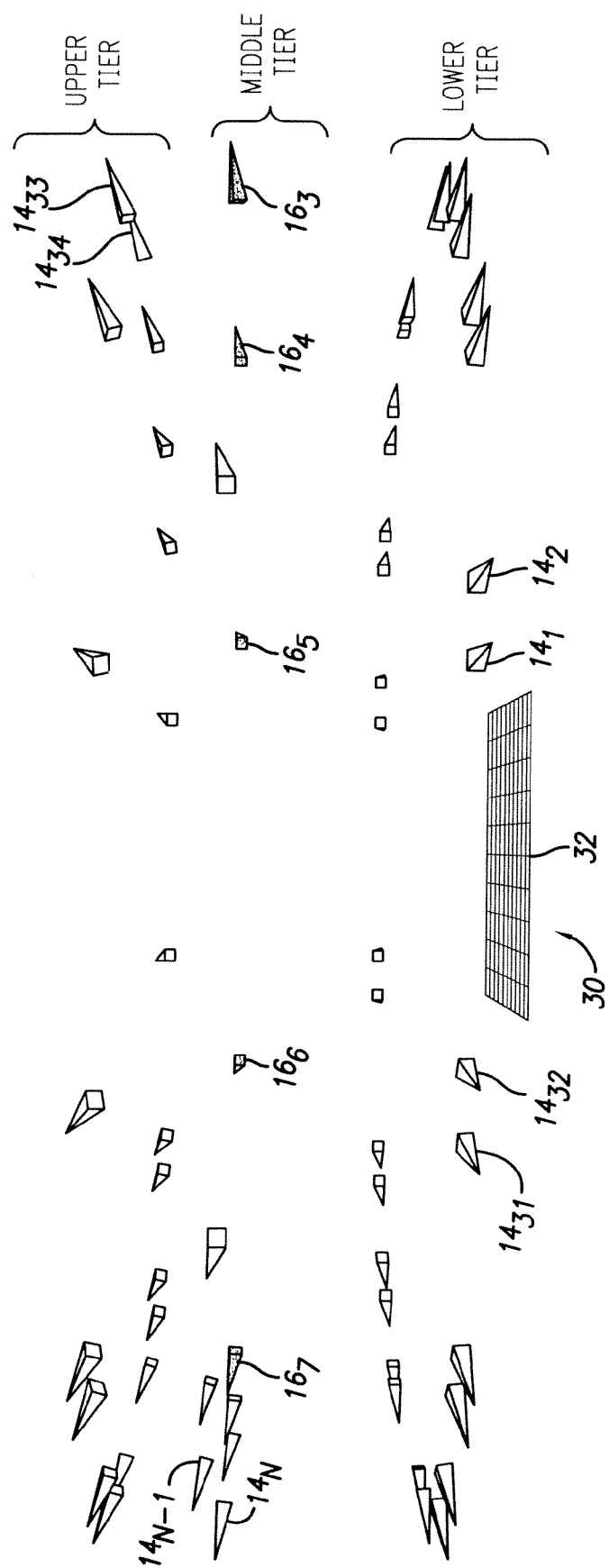
FIG. 3 is a side view of the motion capture volume with a plurality of motion capture cameras arranged around the periphery of the motion capture volume.

FIGS. 2 and 3 illustrate an exemplary motion capture volume 30 surrounded by a plurality of motion capture cameras. The motion capture volume 30 includes a peripheral edge 32. The motion capture volume 30 is illustrated as a rectangular-shaped region subdivided by grid lines. It should be appreciated that the motion capture volume 30 actually comprises a three-dimensional space with the grid defining a floor for the motion capture volume. Motion would be captured within the three-dimensional space above the floor. In a preferred embodiment of the invention, the motion capture volume 30 comprises a floor area of approximately 10 feet by 10 feet, with a height of approximately 6 feet above the floor. Other size and shape motion capture volumes could also be advantageously utilized to suit the particular needs of a production, such as oval, round, rectangular, polygonal, etc.

FIG. 2 illustrates a top view of the motion capture volume 30 with the plurality of motion capture cameras arranged around the peripheral edge 32 in a generally circular pattern. Individual cameras are represented graphically as triangles with the acute angle representing the direction of the lens of the camera, so it should be appreciated that the plurality of cameras are directed toward the motion capture volume 30 from a plurality of distinct directions. More particularly, the plurality of motion capture cameras further include a plurality of body motion cameras $16_1$-$16_8$ and a plurality of facial motion cameras $14_1$-$14_N$. In view of the high number of facial motion cameras in FIG. 2, it should be appreciated that many are not labeled. In the present embodiment of the invention, there are many more facial motion cameras than body motion cameras. The body motion cameras $16_1$-$16_8$ are arranged roughly two per side of the motion capture volume 30, and the facial motion cameras $14_1$-$14_N$ are arranged roughly twelve per side of the motion capture volume 30. The facial motion cameras $14_1$-$14_N$ and the body motion cameras $16_1$-$16_N$ are substantially the same except that the focusing lenses of the facial motion cameras are selected to provide narrower field of view than that of the body motion cameras.

FIG. 3 illustrates a side view of the motion capture volume 30 with the plurality of motion capture cameras arranged into roughly three tiers above the floor of the motion capture volume. A lower tier includes a plurality of facial motion cameras $14_1$-$14_{32}$, arranged roughly eight per side of the motion capture volume 30. In an embodiment of the invention, each of the lower tier facial motion cameras $14_1$-$14_{32}$ are aimed slightly upward so as to not include a camera roughly opposite the motion capture volume 30 from being included within the field of view. The motion capture cameras generally include a light source (e.g., an array of light emitting diodes) used to illuminate the motion capture volume 30. It is desirable to not have a motion capture camera "see" the light source of another motion capture camera, since the light source will appear to the motion capture camera as a bright reflectance that will overwhelm data from the reflective markers. A middle tier includes a plurality of body motion cameras $16_3$-$16_7$ arranged roughly two per side of the motion capture volume 30. As discussed above, the body motion cameras have a wider field of view than the facial motion cameras, enabling each camera to include a greater amount of the motion capture volume 30 within its respective field of view.

The upper tier includes a plurality of facial motion cameras (e.g., $14_{33}$-$14_{52}$), arranged roughly five per side of the motion capture volume 30. In an embodiment of the invention, each of the upper tier facial motion cameras $14_{33}$-$14_{52}$ are aimed slightly downward so as to not include a camera roughly opposite the motion capture volume 30 from being included within the field of view. Shown on the left-hand side of FIG. 2, a number of facial motion cameras (e.g., $14_{53}$-$14_{60}$) are also included in the middle tier focused on the front edge of the motion capture volume 30. Since the actors' performance will be generally facing the front edge of the motion capture volume 30, the number of cameras in that region are increased to reduce the amount of data lost to occlusion. In addition a number of facial motion cameras (e.g., $14_{61}$-$14_{64}$) are included in the middle tier focused on the corners of the motion capture volume 30. These cameras also serve to reduce the amount of data lost to occlusion.

In the preferred embodiment of the invention, the body and facial motion cameras record images of the marked actors from many different angles so that substantially all of the lateral surfaces of the actors are exposed to at least one camera at all times. More specifically, it is preferred that the arrangement of cameras provide that substantially all of the lateral surfaces of the actors are exposed to at least three cameras at all times. By placing the cameras at multiple heights, irregular surfaces can be modeled as the actor moves within the motion capture field 30. The present motion capture system 10 thereby records the actors' body movement simultaneously with facial movement (i.e., expressions). As discussed above, audio recording can also be conducted simultaneously with motion capture.

Figure 4:
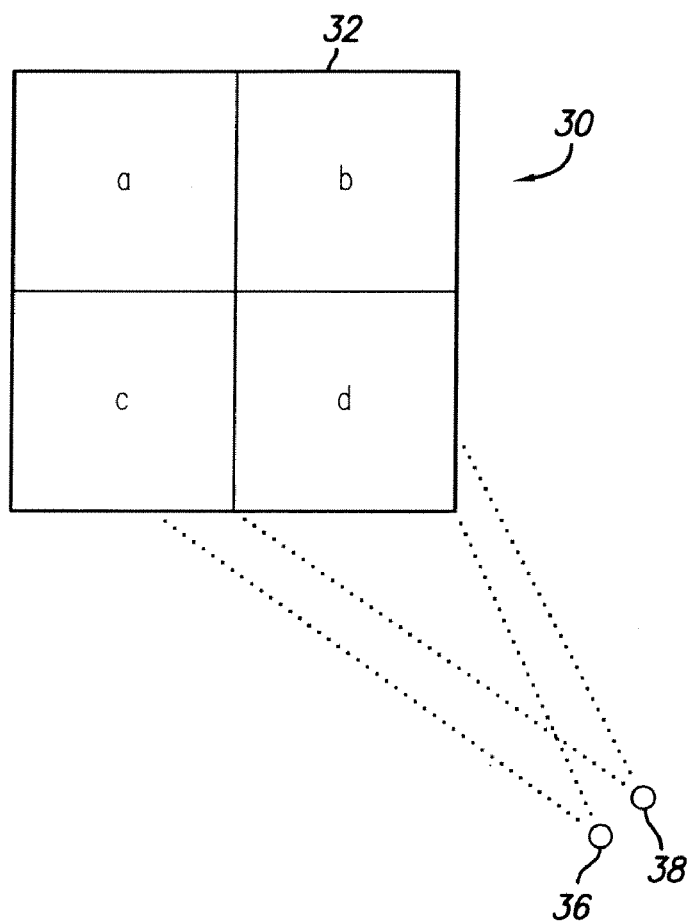
FIG. 4 is a top view of the motion capture volume illustrating an exemplary arrangement of facial motion cameras with respect to a quadrant of the motion capture volume.

FIG. 4 is a top view of the motion capture volume 30 illustrating an exemplary arrangement of facial motion cameras. The motion capture volume 30 is graphically divided into quadrants, labeled a, b, c and d. Facial motion cameras are grouped into clusters 36, 38, with each camera cluster representing a plurality of cameras. For example, one such camera cluster may include two facial motion cameras located in the lower tier and one facial motion camera located in the upper tier. Other arrangements of cameras within a cluster could also be advantageously utilized. The two camera clusters 36, 38 are physically disposed adjacent to each other, yet offset horizontally from each other by a discernable distance. The two camera clusters 36, 38 are each focused on the front edge of quadrant d from an angle of approximately 45°. The first camera cluster 36 has a field of view that extends from partially into the front edge of quadrant c to the right end of the front edge of quadrant d. The second camera cluster 38 has a field of view that extends from the left end of the front edge of quadrant d to partially into the right edge of quadrant d. Thus, the respective fields of view of the first and second camera clusters 36, 38 overlap over the substantial length of the front edge of quadrant d. A similar arrangement of camera clusters is included for each of the other outer edges (coincident with peripheral edge 32) of quadrants a, b, c and d.

Figure 5:
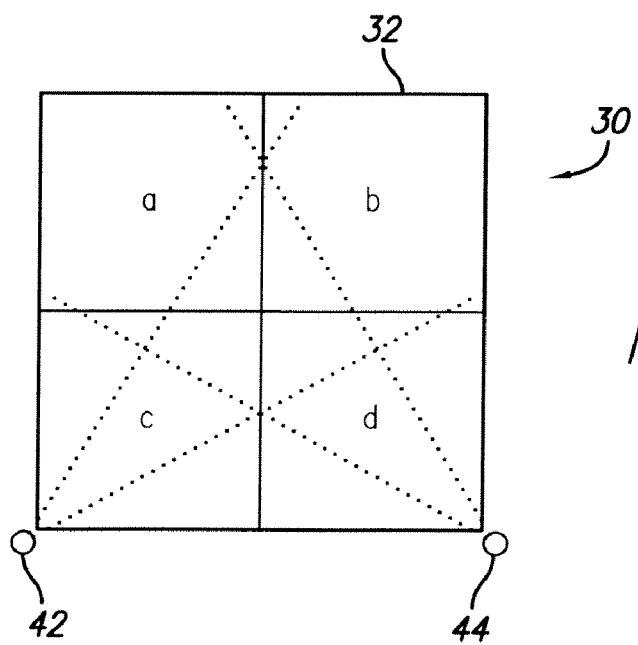
FIG. 5 is a top view of the motion capture volume illustrating an exemplary arrangement of facial motion cameras with respect to corners of the motion capture volume.

FIG. 5 is a top view of the motion capture volume 30 illustrating another exemplary arrangement of facial motion cameras. As in FIG. 4, the motion capture volume 30 is graphically divided into quadrants a, b, c and d. Facial motion cameras are grouped into clusters 42, 44, with each camera cluster representing a plurality of cameras. As in the embodiment of FIG. 4, the clusters may comprise one or more cameras located at various heights. In this arrangement, the camera clusters 42, 44 are located at corners of the motion capture volume 30 facing into the motion capture volume. These corner camera clusters 42, 44 would record images of the actors that are not picked up by the other cameras, such as due to occlusion. Other like camera clusters would also be located at the other corners of the motion capture volume 30.

Having a diversity of camera heights and angles with respect to the motion capture volume 30 serves to increase the available data captured from the actors in the motion capture volume and reduces the likelihood of data occlusion. It also permits a plurality of actors to be motion captured simultaneously within the motion capture volume 30. Moreover, the high number and diversity of the cameras enables the motion capture volume 30 to be substantially larger than that of the prior art, thereby enabling a greater range of motion within the motion capture volume and hence more complex performances. It should be appreciated that numerous alternative arrangements of the body and facial motion cameras can also be advantageously utilized. For example, a greater or lesser number of separate tiers could be utilized, and the actual height of each camera within an individual tier could be varied.

In the foregoing description of the preferred embodiment of the invention, the body and facial motion cameras remain fixed in placed. This way, the motion capture processor 12 has a fixed reference point against which movement of the body and facial markers can be measured. A drawback of this arrangement is that it limits the size of the motion capture volume 30. If it was desired to capture the motion of a performance that requires a greater volume of space (e.g., a scene in which characters are running over a larger distance), the performance would have to be divided up into a plurality of segments that are motion captured separately. In an alternative embodiment of the invention, a portion of the cameras would remain fixed while others would be moved to follow the action. The moveable cameras could all be movable using computer controlled servomotors or could be moved manually by human camera operators. The motion capture processor 12 would track the movement of the cameras, and remove this movement in the subsequent processing of the captured data to generate the three-dimensional digital representation reflecting body and facial motion corresponding to the actors' performances.

Figure 6:
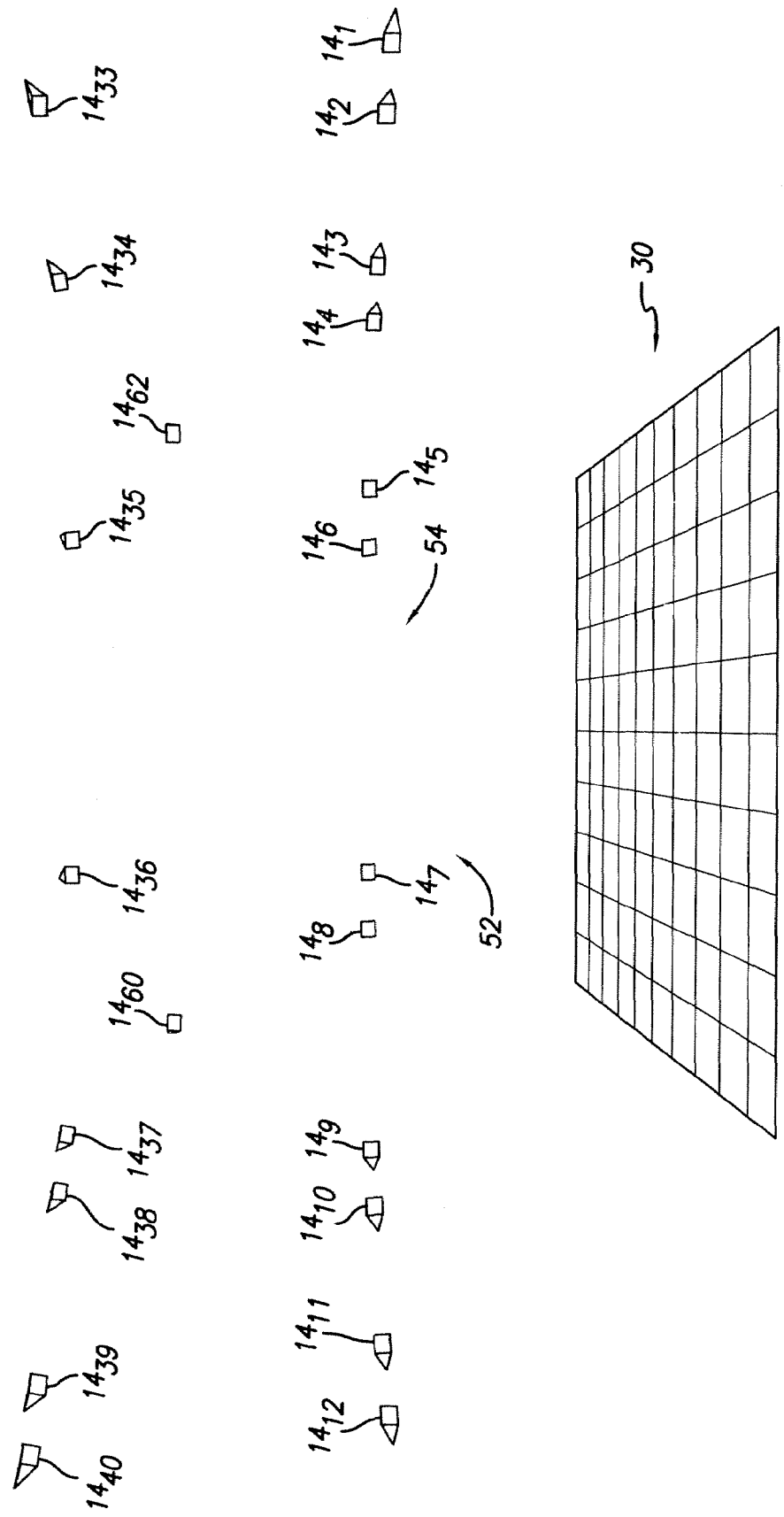
FIG. 6 is a perspective view of the motion capture volume illustrating a motion capture data reflecting two actors in the motion capture volume.

FIG. 6 is a perspective view of the motion capture volume 30 illustrating motion capture data reflecting two actors 52, 54 within the motion capture volume. The view of FIG. 6 reflects how the motion capture data would be viewed by an operator of a workstation 18 as described above with respect to FIG. 1. Similar to FIGS. 2 and 3 (above), FIG. 6 further illustrates a plurality of facial motion cameras, including cameras $14_1$-$14_{12}$ located in a lower tier, cameras $14_{33}$-$14_{40}$ located in an upper tier, and cameras $14_{60}$, $14_{62}$ located in the corners of motion capture volume 30. The two actors 52, 54 appear as a cloud of dots corresponding to the reflective markers on their body and face. As shown and discussed above, there are a much higher number of markers located on the actors' faces than on their bodies. The movement of the actors' bodies and faces is tracked by the motion capture system 10, as substantially described above.

Figure 7:
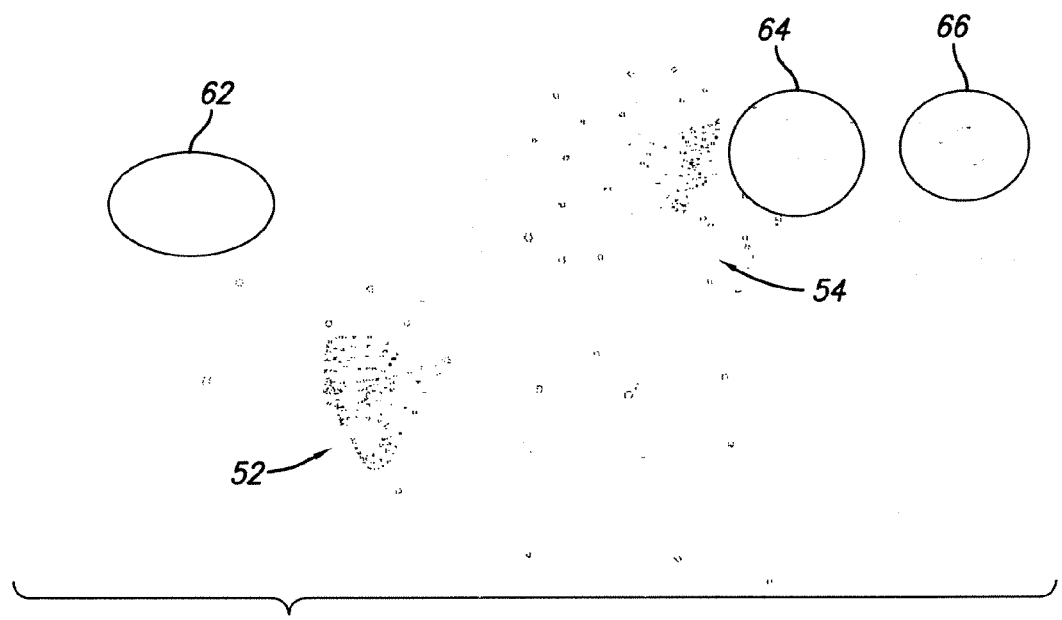
FIG. 7 illustrates motion capture data reflecting two actors in the motion capture volume and showing occlusions regions of the data.
Figure 8:
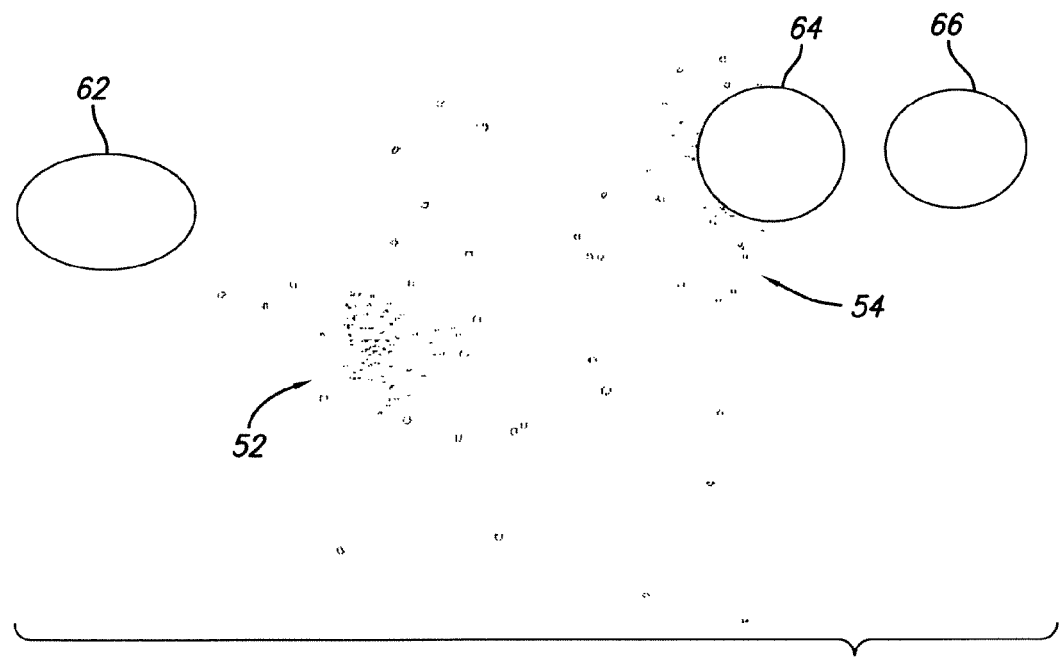
FIG. 8 illustrates motion capture data as in FIG. 7, in which one of the two actors has been obscured by an occlusion region.

Referring now to FIGS. 7 and 8, motion capture data is shown as it would be viewed by an operator of a workstation 18. As in FIG. 6, the motion capture data reflects two actors 52, 54 in which the high concentration of dots reflects the actors' faces and the other dots reflect body points. The motion capture data further includes three occlusion regions 62, 64, 66 illustrated as oval shapes. The occlusion regions 62, 64, 66 represent places in which reliable motion data was not captured due to light from one of the cameras falling within the fields of view of other cameras. This light overwhelms the illumination from the reflective markers, and is interpreted by motion capture processor 12 as a body or facial marker. The image processing process executed by the motion capture processor 12 generates a virtual mask that filters out the camera illumination by defining the occlusion regions 62, 64, 66 illustrated in FIGS. 7 and 8. The production company can attempt to control the performance of the actors to physically avoid movement that is obscured by the occlusion regions. Nevertheless, some loss of data capture inevitably occurs, as shown in FIG. 8 in which the face of actor 54 has been almost completely obscured by physical movement into the occlusion region 64.

Figure 9:
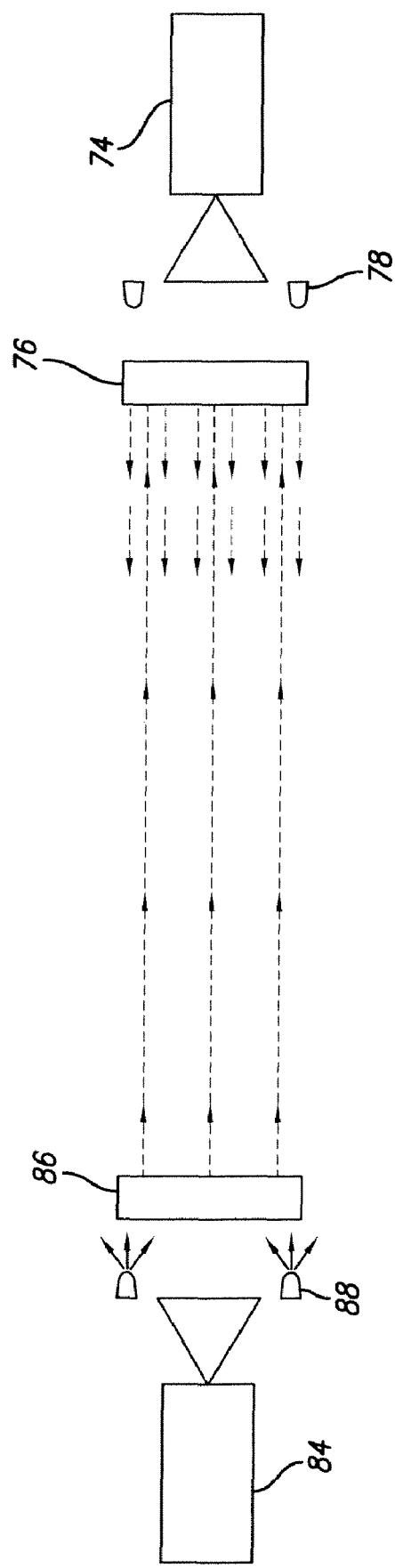
FIG. 9 is a block diagram illustrating an alternative embodiment of the motion capture cameras utilized in the motion capture system.

FIG. 9 illustrates an embodiment of the motion capture system that reduces the occlusion problem. Particularly, FIG. 9 illustrates cameras 84 and 74 that are physically disposed opposite one another across the motion capture volume (not shown). The cameras 84, 74 include respective light sources 88, 78 adapted to illuminate the fields of view of the cameras. The cameras 84, 74 are further provided with polarized filters 86, 76 disposed in front of the camera lenses. As will be clear from the following description, the polarized filters 86, 76 are arranged (i.e., rotated) out of phase with respect to each other. Light source 88 emits light that is polarized by polarized filter 86. The polarized light reaches polarized filter 76 of camera 74, but, rather than passing through to camera 74, the polarized light is reflected off of or absorbed by polarized filter 76. As a result, the camera 84 will not "see" the illumination from camera 74, thereby avoiding formation of an occlusion region and obviating the need for virtual masking.

While the preceding description referred to the use of optical sensing of physical markers affixed to the body and face to track motion, it should be appreciated to those skilled in the art that alternative ways to track motion could also be advantageously utilized. For example, instead of affixing markers, physical features of the actors (e.g., shapes of nose or eyes) could be used as natural markers to track motion. Such a feature-based motion capture system would eliminate the task of affixing markers to the actors prior to each performance. In addition, alternative media other than optical could be used to detect corresponding markers. For example, the markers could comprise ultrasonic or electromagnetic emitters that are detected by corresponding receivers arranged around the motion capture volume. In this regard, it should be appreciated that the cameras described above are merely optical sensors and that other types of sensors could also be advantageously utilized.

Having thus described a preferred embodiment of a system and method for capturing body and facial motion, it should be apparent to those skilled in the art that certain advantages of the invention have been achieved. It should also be appreciated that various modifications, adaptations, and alternative embodiments thereof may be made within the scope and spirit of the present invention. The invention is further defined by the following claims.

What is claimed is:

1. A system for capturing motion, comprising:
   a motion capture volume adapted to contain at least one actor having body markers defining plural body points and facial markers defining plural facial points, the body markers being substantially larger than the facial markers;
   a plurality of motion capture cameras arranged around a periphery of said motion capture volume, said motion capture cameras being arranged such that all laterally exposed surfaces of said at least one actor while in motion within said motion capture volume are within a field of view of at least one of said plurality of motion capture cameras at substantially all times; and
   a motion capture processor coupled to said plurality of motion capture cameras to produce a digital representation reflecting combined facial and body motion of said at least one actor;
   wherein, the body motion further comprises relatively large-scale movements of an actor's head, torso, arms and legs, and the facial motion further comprises relatively small-scale movements of facial muscles in forming a facial expression.

2. The system for capturing motion of claim 1, wherein the plurality of motion capture cameras further comprises a plurality of body motion cameras arranged around said periphery of said motion capture volume and a plurality of facial motion cameras arranged around said periphery of said motion capture volume, wherein said facial motion cameras each have a respective field of view narrower than a corresponding field of view of said body motion cameras.

3. The system for capturing motion of claim 1, wherein said motion capture volume further comprises a rectangular area subdivided into a plurality of quadrants, said plurality of quadrants each further comprising plural edges coincident with said periphery of said motion capture volume, said plurality of motion capture cameras including first subgroups of cameras oriented toward respective ones of said edges.

4. The system for capturing motion of claim 3, wherein said plurality of motion capture cameras include second subgroups of cameras oriented toward respective ones of said edges and spatially separated from said first subgroups of cameras.

5. The system for capturing motion of claim 4, wherein said first subgroups of cameras are oriented with respect to said second subgroups of cameras so that their respective fields of view substantially overlap.

6. The system for capturing motion of claim 3, wherein said first subgroups of cameras and said second subgroups of cameras each further comprise at least three cameras.

7. The system for capturing motion of claim 3, wherein said plurality of motion capture cameras further comprise third subgroups of cameras disposed respectively at corners of said motion capture volume and oriented generally toward a center of said motion capture volume.

8. The system for capturing motion of claim 1, wherein at least a first portion of said plurality of motion capture cameras are disposed at a first height above ground, and at least a second portion of said plurality of motion capture cameras are disposed at a second height above ground greater than said first height.

9. The system for capturing motion of claim 8, wherein said first portion of said plurality of motion capture cameras are oriented slightly upward to not encompass within respective fields of view other ones of said first portion of said plurality of motion capture cameras disposed substantially across said motion capture volume.

10. The system for capturing motion of claim 2, wherein said plurality of facial motion cameras and said plurality of body motion cameras are fixed.

11. The system for capturing motion of claim 2, wherein a portion of said plurality of facial motion cameras and a portion of said plurality of body motion cameras are movable to track motion within said motion capture volume.

12. The system for capturing motion of claim 1, wherein said motion capture volume further comprises an area of approximately one hundred square feet.

13. The system for capturing motion of claim 2, wherein said plurality of facial motion cameras and said plurality of body motion cameras each further comprise polarized light sources oriented to illuminate said motion capture volume and polarized filter to block polarized light from other cameras disposed across said motion capture volume.

14. The system for capturing motion of claim 1, further comprising at least one microphone oriented to pick up audio from said motion capture volume.

* * * * *